(12) United States Patent
Bruno et al.

(10) Patent No.: US 10,486,817 B2
(45) Date of Patent: Nov. 26, 2019

(54) ENVIRONMENTAL CONTROL SYSTEM WITH AN OUTFLOW HEAT EXCHANGER

(71) Applicant: Hamilton Sundstrand Corporation, Charlotte, NC (US)

(72) Inventors: Louis J. Bruno, Ellington, CT (US); Harold W. Hipsky, Willington, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 52 days.

(21) Appl. No.: 15/605,697

(22) Filed: May 25, 2017

(65) Prior Publication Data

US 2017/0341768 A1    Nov. 30, 2017

Related U.S. Application Data

(60) Provisional application No. 62/341,899, filed on May 26, 2016.

(51) Int. Cl.
| | | |
|---|---|---|
| *B64D 13/08* | (2006.01) | |
| *B64D 13/02* | (2006.01) | |
| *F25B 9/00* | (2006.01) | |
| *F25B 9/10* | (2006.01) | |
| *B64D 13/06* | (2006.01) | |

(52) U.S. Cl.
CPC ............. *B64D 13/08* (2013.01); *B64D 13/02* (2013.01); *B64D 13/06* (2013.01); *F25B 9/004* (2013.01); *F25B 9/10* (2013.01); *B64D 2013/0618* (2013.01); *B64D 2013/0648* (2013.01); *B64D 2013/0688* (2013.01); *Y02T 50/56* (2013.01)

(58) Field of Classification Search
CPC combination set(s) only.
See application file for complete search history.

(56) References Cited

U.S. PATENT DOCUMENTS

| | | |
|---|---|---|
| 2,800,002 A | 7/1957 | Seed |
| 3,428,242 A | 2/1969 | Rannenberg |
| 4,021,215 A | 5/1977 | Rosenbush |
| 4,261,416 A | 4/1981 | Hamamoto |
| 4,374,469 A | 2/1983 | Rannenberg |
| 5,299,763 A | 4/1994 | Bescoby et al. |

(Continued)

FOREIGN PATENT DOCUMENTS

| | | |
|---|---|---|
| CA | 2968745 A1 | 11/2017 |
| EP | 1112930 A2 | 7/2001 |

(Continued)

OTHER PUBLICATIONS

Extended Search Report dated Jun. 7, 2018 in European Patent Application No. 17204787.

(Continued)

*Primary Examiner* — Henry T Crenshaw
(74) *Attorney, Agent, or Firm* — Cantor Colburn LLP

(57) ABSTRACT

An airplane is provided. The airplane includes a pressurized volume and an air conditioning system. The pressurized volume provides a first medium. The air conditioning system includes a heat exchanger and a compressor. The heat exchanger transfers heat from a second medium to the first medium. The compressor receives the second medium. The compressor is upstream of the heat exchanger in a flow path of the second medium.

29 Claims, 7 Drawing Sheets

(56) References Cited

U.S. PATENT DOCUMENTS

| | | | |
|---|---|---|---|
| 5,461,882 A | 10/1995 | Zywiak | |
| 5,473,899 A | 12/1995 | Viteri | |
| 5,899,085 A | 5/1999 | Williams | |
| 5,911,388 A | 6/1999 | Severson et al. | |
| 5,967,461 A | 10/1999 | Farrington | |
| 6,199,387 B1 | 3/2001 | Sauterleute | |
| 6,257,003 B1 | 7/2001 | Hipsky | |
| 6,505,474 B2 | 1/2003 | Sauterleute et al. | |
| 6,519,969 B2 | 2/2003 | Sauterleute | |
| 6,615,606 B2 | 9/2003 | Zywiak | |
| 6,776,002 B1 | 8/2004 | Ho | |
| 6,845,630 B2 | 1/2005 | Bruno | |
| 6,848,261 B2 | 2/2005 | Claeys | |
| 7,222,499 B2 | 5/2007 | Hunt | |
| 7,607,318 B2 | 10/2009 | Lui et al. | |
| 7,624,592 B2 | 12/2009 | Lui et al. | |
| 7,950,606 B2 | 5/2011 | Atkey et al. | |
| 8,042,354 B1 | 10/2011 | Dziorny et al. | |
| 8,099,973 B2 | 1/2012 | Sampson et al. | |
| 8,302,407 B2 | 11/2012 | Alecu | |
| 8,985,966 B2 | 3/2015 | Sampson et al. | |
| 9,109,514 B2 | 8/2015 | Cheong | |
| 9,169,024 B2 | 10/2015 | Voinov | |
| 9,211,954 B2 | 12/2015 | Barkowsky | |
| 9,481,468 B1* | 11/2016 | Schiff | B64D 13/00 |
| 9,555,893 B2 | 1/2017 | Squier | |
| 10,059,458 B2 | 8/2018 | Squier | |
| 2001/0004837 A1 | 6/2001 | Sauterleute | |
| 2003/0051500 A1 | 3/2003 | Asfia | |
| 2003/0126880 A1 | 7/2003 | Zywiak | |
| 2004/0014419 A1 | 1/2004 | Lents et al. | |
| 2004/0055309 A1 | 3/2004 | Bellows | |
| 2006/0059927 A1 | 3/2006 | Zywiak et al. | |
| 2007/0266695 A1 | 11/2007 | Lui et al. | |
| 2009/0117840 A1 | 5/2009 | Kresser | |
| 2009/0317248 A1 | 12/2009 | Tanaka et al. | |
| 2010/0043794 A1 | 2/2010 | Saito et al. | |
| 2010/0323601 A1 | 12/2010 | Cremers et al. | |
| 2012/0118528 A1* | 5/2012 | Al-Ali | B64D 13/08 165/41 |
| 2012/0156027 A1 | 6/2012 | Merritt et al. | |
| 2013/0033348 A1 | 2/2013 | Saito et al. | |
| 2013/0133348 A1 | 5/2013 | Squier | |
| 2013/0136590 A1 | 5/2013 | Higashimori | |
| 2014/0109603 A1* | 4/2014 | Fernandes | B64D 13/06 62/89 |
| 2014/0238043 A1 | 8/2014 | Sokhey et al. | |
| 2014/0353461 A1* | 12/2014 | Vignali | F16M 13/02 248/674 |
| 2015/0013355 A1 | 1/2015 | Klimpel et al. | |
| 2015/0065025 A1 | 3/2015 | Bruno et al. | |
| 2015/0251765 A1 | 9/2015 | Jonqueres et al. | |
| 2015/0251766 A1 | 9/2015 | Atkey | |
| 2015/0307195 A1 | 10/2015 | Bruno | |
| 2015/0329210 A1* | 11/2015 | Bammann | B60H 1/00435 62/61 |
| 2016/0083100 A1* | 3/2016 | Bammann | B64D 13/06 62/89 |
| 2017/0021296 A1* | 1/2017 | Paul | B01D 53/02 |
| 2017/0129614 A1 | 5/2017 | Bammann et al. | |
| 2017/0342899 A1 | 11/2017 | Bruno et al. | |
| 2018/0057175 A1 | 3/2018 | Kumpel et al. | |

FOREIGN PATENT DOCUMENTS

| | | |
|---|---|---|
| EP | 1129941 A2 | 9/2001 |
| EP | 1386837 | 2/2004 |
| EP | 2597036 A2 | 5/2013 |
| EP | 2602191 A1 | 6/2013 |
| EP | 2845804 A1 | 3/2015 |
| EP | 2937287 A1 | 10/2015 |
| EP | 2947012 A1 | 11/2015 |
| JP | 5909163 B2 | 4/2016 |
| WO | 03035472 A1 | 5/2003 |
| WO | 2016004021 A1 | 1/2016 |

OTHER PUBLICATIONS

European Office Action for European Application No. 17172757.1 dated Nov. 30, 2018; 6 Pages.
Search Report dated Oct. 5, 2017 in European Application No. 17173077.
Search Report dated Oct. 5, 2017 in European Application No. 17172816.
Search Report dated Oct. 6, 2017 in European Application No. 17172822.
Search Report dated Oct. 9, 2017 in European Application No. 17172889.
Search Report dated Oct. 11, 2017 in European Application No. 17172834.
Search Report dated Oct. 20, 2017 in European Application No. 17172830.
Search Report dated Oct. 20, 2017 in European Application No. 17172757.
Search Report dated Oct. 25, 2017 in European Application No. 17173043.
Search Report dated Nov. 2, 2017 in European Application No. 17172891.
Search Report dated Nov. 10, 2017 in European Application No. 17172821.

* cited by examiner

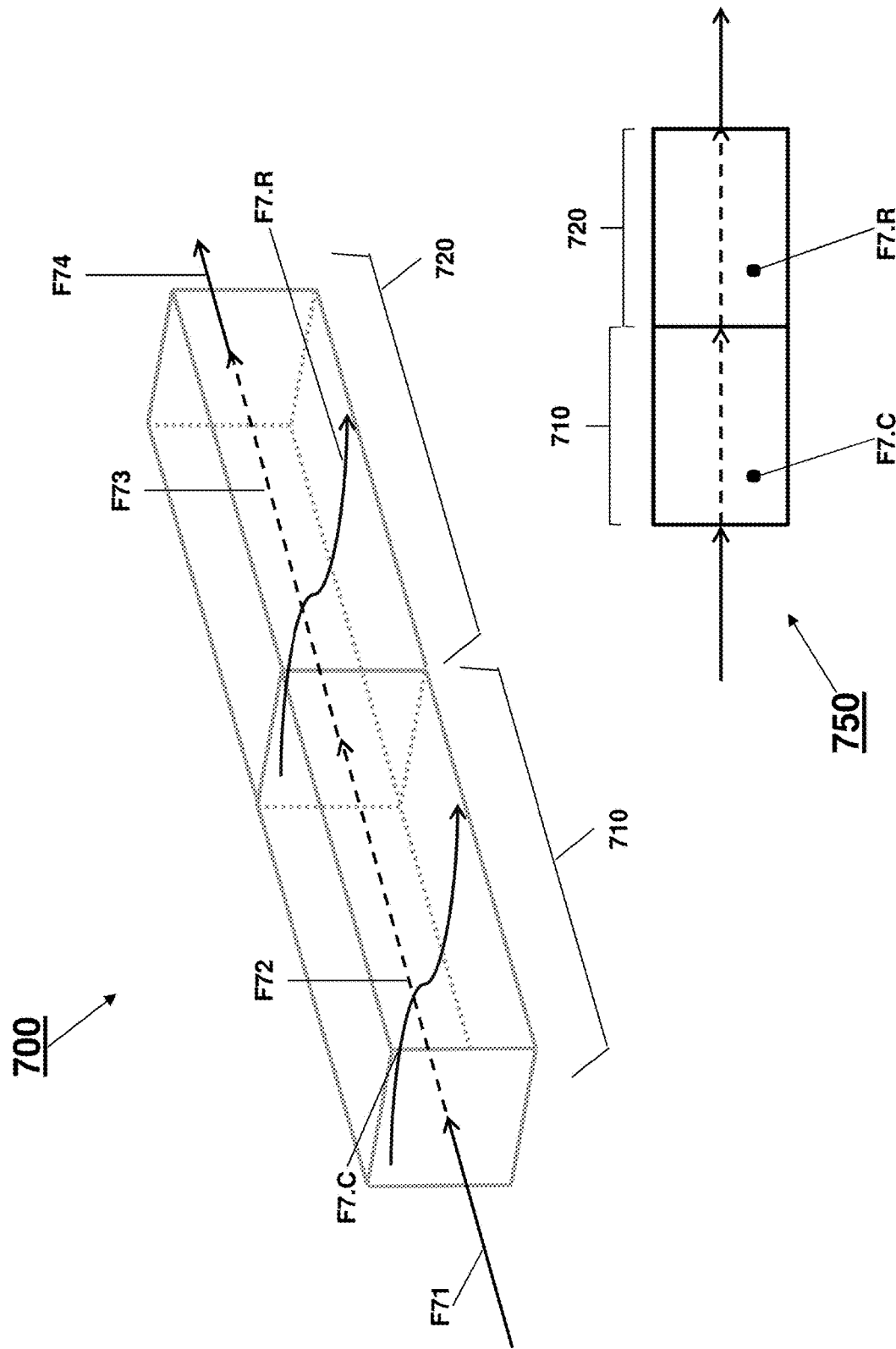

ENVIRONMENTAL CONTROL SYSTEM WITH AN OUTFLOW HEAT EXCHANGER

CROSS-REFERENCE TO RELATED APPLICATION

This application claims benefit of priority to U.S. Provisional Application No. 62/341,899 filed May 26, 2016, the disclosure of which is incorporated herein by reference in its entirety.

BACKGROUND

In general, contemporary air condition systems are supplied a pressure at cruise that is approximately 30 psig to 35 psig. The trend in the aerospace industry today is towards systems with higher efficiency. One approach to improve airplane efficiency is to eliminate the bleed air entirely and use electrical power to compress outside air. A second approach is to use lower engine pressure. The third approach is to use the energy in the bleed air to compress outside air and bring it into the cabin.

BRIEF DESCRIPTION

According to one or more embodiments, an airplane is provided. The airplane comprises a pressurized volume configured to provide a first medium, and an air conditioning system. The air conditioning system comprises a heat exchanger configured to transfer heat from a second medium to the first medium, and a compressor configured to receive the second medium, wherein the compressor is upstream of the heat exchanger in a flow path of the second medium.

According to one or more embodiments or the airplane embodiment above, the first medium can be cabin discharge air, and the second medium can be fresh air.

According to one or more embodiments or any of the airplane embodiments above, the airplane can comprise an outflow valve downstream of the heat exchanger in a flow path of the first medium.

According to one or more embodiments or any of the airplane embodiments above, the airplane can comprise a turbine downstream of the heat exchanger in a flow path of the first medium.

According to one or more embodiments or any of the airplane embodiments above, the airplane can comprise a flow of a third medium; and a second heat exchanger configured to transfer heat from the third medium to the first medium.

According to one or more embodiments or any of the airplane embodiments above, the heat exchanger and the second heat exchanger can comprise a continuous second medium surface.

According to one or more embodiments or any of the airplane embodiments above, the heat exchanger and the second heat exchanger can comprise one or more a continuous second medium fins.

According to one or more embodiments or any of the airplane embodiments above, the heat exchanger and the second heat exchanger can be included in a dual heat exchanger.

According to one or more embodiments or any of the airplane embodiments above, the third medium can be pressurized air.

According to one or more embodiments or any of the airplane embodiments above, the second heat exchanger can be downstream of the heat exchanger in a flow path of the first medium.

According to one or more embodiments or any of the airplane embodiments above, the airplane can comprise an outflow valve downstream of the heat exchanger in the flow path of the first medium.

According to one or more embodiments or any of the airplane embodiments above, the airplane can comprise a turbine downstream of the heat exchanger in the flow path of the first medium.

According to one or more embodiments, an airplane is provided. The airplane comprises a pressurized volume configured to provide a first medium; and an air conditioning system comprising: a three medium heat exchanger; and a compressor configured to receive a second medium, wherein the compressor is upstream of the three medium heat exchanger in a flow path of the second medium.

According to one or more embodiments or the airplane embodiment above, the first medium can be cabin discharge air, and the second medium can be fresh air.

According to one or more embodiments or any of the airplane embodiments above, the three medium heat exchanger can be configured to receive the first medium, the second medium, and a third medium, and the third medium and the first medium can be heat sinks for the second medium.

According to one or more embodiments or any of the airplane embodiments above, the third medium can be ram air.

According to one or more embodiments or any of the airplane embodiments above, the second medium can reject heat to the first medium and then subsequently can reject heat to the third medium.

According to one or more embodiments or any of the airplane embodiments above, the second medium can reject heat to the third medium and then subsequently can reject heat to the first medium.

According to one or more embodiments or any of the airplane embodiments above, the flow path of the second medium through the three medium heat exchanger can be linear.

According to one or more embodiments or any of the airplane embodiments above, the flow path of the second medium through the three medium heat exchanger can be non-linear.

According to one or more embodiments, an airplane is provided. The airplane comprises a pressurized volume configured to provide a first medium; and an air conditioning system comprising: a four medium heat exchanger; and a compressor configured to receive a second medium, wherein the compressor is upstream of the four medium heat exchanger in a flow path of the second medium.

According to one or more embodiments or the airplane embodiment above, the first medium can be cabin discharge air, and the second medium can be fresh air.

According to one or more embodiments or any of the airplane embodiments above, the four medium heat exchanger can be configured to receive the first medium, the second medium, a third medium, and a fourth medium, and the third medium and the first medium can be heat sinks for the second medium and the fourth medium.

According to one or more embodiments or any of the airplane embodiments above, the third medium can be ram air, and the fourth medium can be pressurized air.

According to one or more embodiments or any of the airplane embodiments above, the second medium can reject heat to the first medium and can reject heat to the third medium, and the fourth medium can reject heat to the first medium and can reject heat to the third medium.

According to one or more embodiments or any of the airplane embodiments above, the first medium can receive heat from the second medium and can receive heat from the fourth medium.

According to one or more embodiments, an airplane is provided. The airplane comprises a pressurized volume is configured to provide a first medium; and an air conditioning system comprising: a first heat exchanger configured to transfer heat from a second medium to the first medium, a second heat exchanger configured to transfer heat from the second medium to a third medium, a third heat exchanger configured to transfer heat from a fourth medium to the first medium, and a fourth heat exchanger configured to transfer heat from the fourth medium to the third medium.

According to one or more embodiments or the airplane embodiment above, the first heat exchanger can be upstream of the third heat exchanger in a flow path of the first medium.

According to one or more embodiments or any of the airplane embodiments above, the first heat exchanger can be upstream of the second heat exchanger in a flow path of the second medium.

According to one or more embodiments or any of the airplane embodiments above, the third heat exchanger can be upstream of the forth heat exchanger in a flow path of the fourth medium.

Additional features and advantages are realized through the techniques of the embodiments herein. Other embodiments are described in detail herein and are considered a part of the claims. For a better understanding of the embodiments with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages thereof are apparent from the following detailed description taken in conjunction with the accompanying drawings in which:

FIG. 7 is a diagram of a schematic of an exchanger configuration according to another embodiment.

DETAILED DESCRIPTION

A detailed description of one or more embodiments of the disclosed apparatus and method are presented herein by way of exemplification and not limitation with reference to the FIGS.

Embodiments herein provide an environmental control system of an aircraft that mixes mediums from different sources and uses the different energy sources to power the environmental control system and to provide cabin pressurization and cooling at a high fuel burn efficiency. The medium can generally be air, while other examples include gases, liquids, fluidized solids, or slurries.

Figure 1:
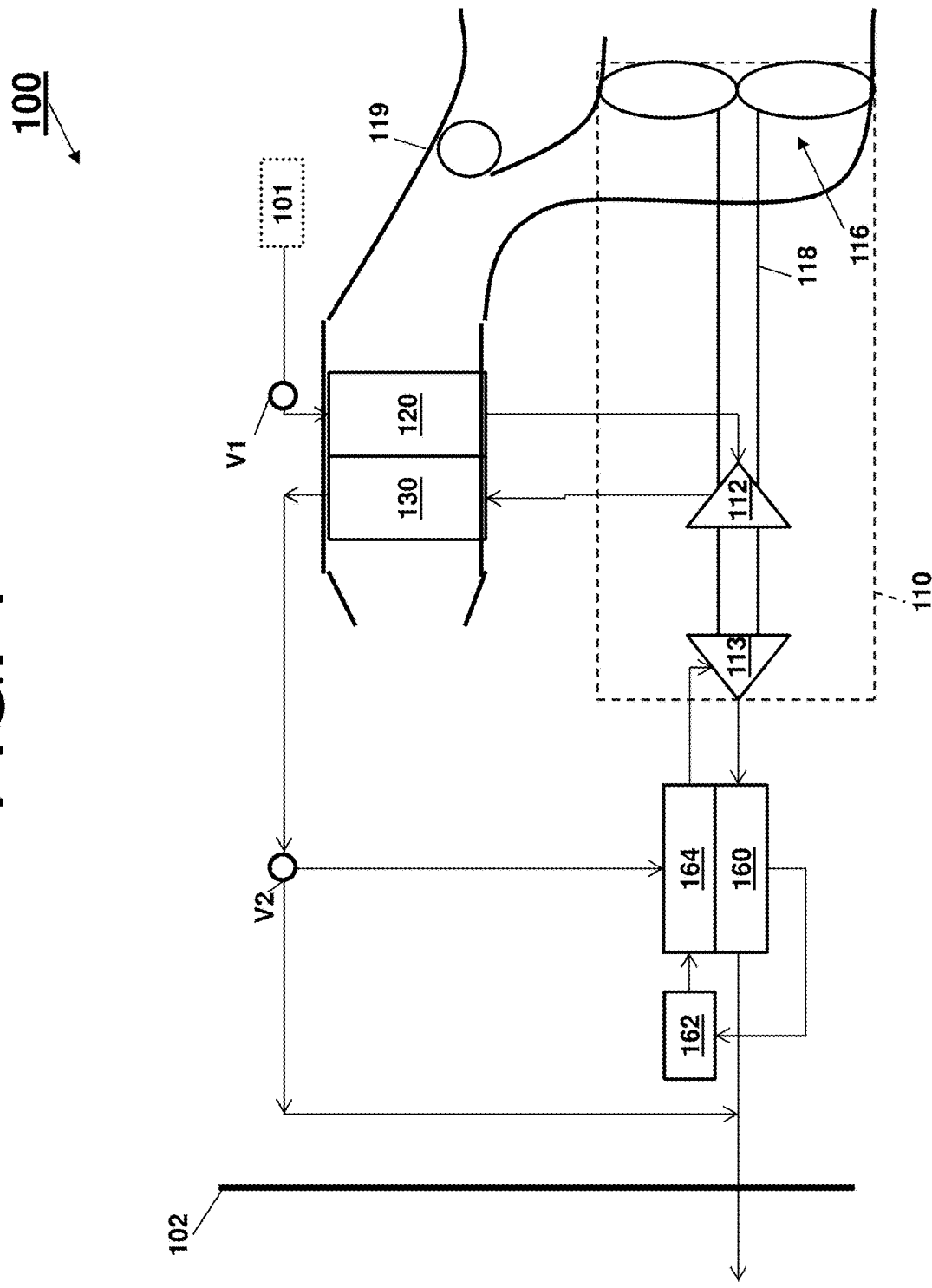
FIG. 1 is a diagram of a schematic of an environmental control system according to an embodiment.

Turning to FIG. 1, a system 100 that receives a medium from an inlet 101 and provides a conditioned form of the medium to a chamber 102 is illustrated. The system 100 comprises a compressing device 110. As shown, the compressing device 110 comprises a compressor 112, a turbine 113, a fan 116, and a shaft 118. The system 100 also comprises a primary heat exchanger 120, a secondary heat exchanger 130, a condenser 160, a water extractor 162, and a reheater 164.

The compressing device 110 is a mechanical device that includes components for performing thermodynamic work on the medium (e.g., extracts work from or works on the medium by raising and/or lowering pressure and by raising and/or lowering temperature). Examples of the compressing device 110 include an air cycle machine, a three-wheel air cycle machine, a four wheel air cycle machine, etc.

The compressor 112 is a mechanical device that raises the pressure of the medium received from the inlet 101. Examples of compressor types include centrifugal, diagonal or mixed-flow, axial-flow, reciprocating, ionic liquid piston, rotary screw, rotary vane, scroll, diaphragm, air bubble, etc. Further, compressors can be driven by a motor or the medium via the turbine 113.

The turbine 113 is mechanical device that drives the compressor 112 and the fan 116 via the shaft 118. The fan 116 (e.g., a ram air fan) is a mechanical device that can force via push or pull methods air through the shell 119 across the heat exchangers 120 and 130 at a variable cooling to control temperatures. The shell 119 receives and directs a medium (such as ram air) through the system 100. In general, ram air is outside air used as a heat sink by the system 100.

The heat exchangers 120 and 130 are devices built for efficient heat transfer from one medium to another. Examples of heat exchangers include double pipe, shell and tube, plate, plate and shell, adiabatic wheel, plate fin, pillow plate, and fluid heat exchangers.

The condenser 160 and the reheater 164 are particular types of heat exchangers. The water extractor 162 is a mechanical device that performs a process of taking water from the medium. Together, the condenser 160, the water extractor 162, and/or the reheater 164 can combine to be a high pressure water separator.

The elements of the system 100 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system 100. Valves can be operated by actuators, such that flow rates of the medium in any portion of the system 100 can be regulated to a desired value.

As shown in FIG. 1, the medium can flow from an inlet 101 through the system 100 to a chamber 102, as indicated by solid-lined arrows. A vale V1 (e.g., a mass flow control valve) controls the flow of the medium from the inlet 101 to the system 100. Further, a vale V2 controls whether the flow of the medium from the secondary heat exchanger 130 bypasses the turbine 113 in accordance with a mode of the system 100. A combination of components of the system 100 can be referred to as an air conditioning pack or a pack. The pack can begin at a vale V1 and conclude as air exits the condenser 162.

The system 100 will now be described in view of the above aircraft embodiment. In the aircraft embodiment, the medium can be air and the system 100 can be an environmental control system. The air supplied to the environmental control system at the inlet 101 can be said to be "bled" from a turbine engine or an auxiliary power unit. When the air is being provided by the turbine engine or the auxiliary power unit connected to the environmental control system, such as from the inlet 101, the air can be referred to as bleed air (e.g., pressurized air that comes from an engine or an auxiliary power unit). The temperature, humidity, and pressure of the bleed air vary widely depending upon a compressor stage and a revolutions per minute of the turbine engine.

Figure 2:
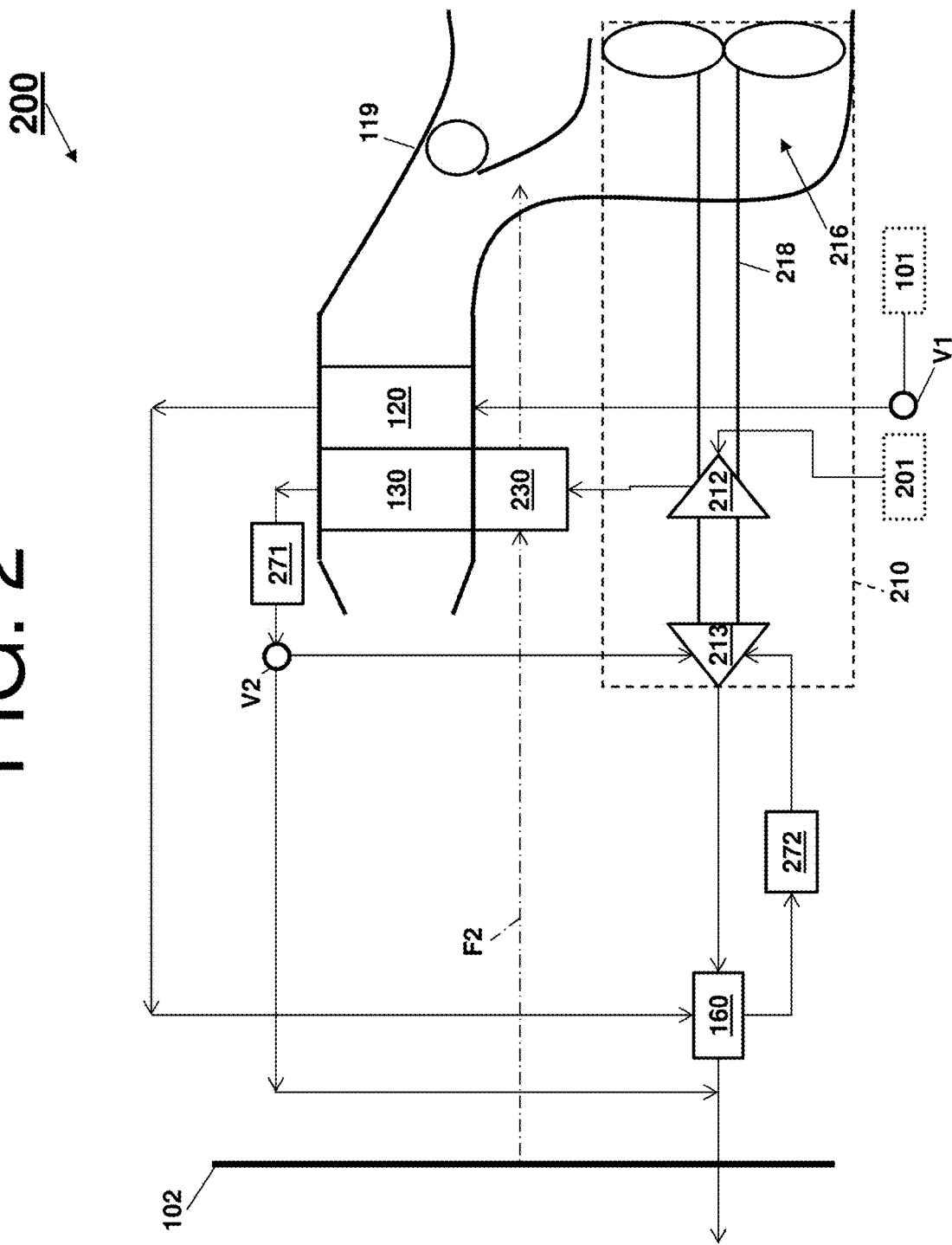
FIG. 2 is a diagram of a schematic of an environmental control system that includes an outflow heat exchanger according to an embodiment.

Turning now to FIG. 2, a schematic of an environmental control system 200 (e.g., an embodiment of system 100) is depicted according to an embodiment, as it could be installed on an aircraft. In operation, the environmental control system 200 mixes fresh air with bleed air. Components of the system 100 that are similar to the environmental control system 200 have been reused for ease of explanation, by using the same identifiers, and are not re-introduced. Alternative components of the environmental control system 200 include a compressing device 210 (that comprises a compressor 212, a turbine 213, a fan 116, and a shaft 118), an inlet 201, an outflow heat exchanger 230, a water collector 271, and a water collector 272, along with a path for a medium denoted by a dot-dashed line F2 (where the medium can be provided from the chamber 102 into the environmental control system 200). Note that the turbine 213 is mechanical device that drives the compressor 212 and the fan 216 via the shaft 218. The turbine 213 can be a duel entry turbine and include a plurality of inlet gas flow paths, such as an inner flow path and an outer flow path, to enable mixing of alternative medium flows at the exit of the turbine. The inner flow path can be a first diameter, and the outer flow path can be a second diameter In view of the above aircraft embodiment, when the medium is being provided from the chamber 102 (e.g., air leaving a pressurized volume, cabin of the aircraft, or cabin and flight deck of the aircraft), the medium can be referred as chamber discharge air (also known as cabin discharge air). Note that in one or more embodiments, an exhaust of the cabin discharge air from the environmental control system 200 can be released through the shell 119 or sent to a cabin pressure control system. The cabin discharge air can also be released through an outflow valve (a.k.a. an outflow control valve and a thrust recovery outflow valve). For example, when the cabin discharge air from the outflow heat exchanger 230 is coupled to the outflow valve, the outflow heat exchanger 230 increases the energy in the cabin discharge air, which increases the thrust recovered by the outflow valve.

Further, when a medium is being provided from the inlet 201, the medium can be referred to as fresh outside air (also known as fresh air or outside air destined to enter the pressurized volume or chamber 102). The fresh outside air can be procured by one or more scooping mechanisms, such as an impact scoop or a flush scoop. Thus, the inlet 201 can be considered a fresh air inlet.

In low altitude operation of the environmental control system 200, high-pressure high-temperature air from either the turbine engine or the auxiliary power unit via inlet 101 through the valve V1 enters the primary heat exchanger 120. The primary heat exchanger 120 cools the pressure high-temperature air to nearly ambient temperature to produce cool high pressure air. This cool high pressure air enters the condenser 160, where it is further cooled by air from the turbine 213 of the compressing device 210. Upon exiting the condenser 160, the cool high pressure air enters the water extractor 272 so that moisture in the air is removed.

The cool high pressure air enters the turbine 213 through a nozzle. The cool high pressure air is expanded across the turbine 213 and work extracted from the cool high pressure air. This extracted work drives the compressor 212 used to compress fresh outside air. This extracted work also drives the fan 216, which is used to move air (e.g., ram air) through the primary heat exchanger 120 and the secondary heat exchanger 130 (also known as ram air heat exchangers).

The act of compressing the fresh outside air, heats the fresh outside air. The compressed fresh outside air enters the outflow heat exchanger 230 and is cooled by the cabin discharge air (see the dot-dashed line F2) to produce cooled compressed fresh outside air. The outflow heat exchanger 230 exhausts the cabin discharge through the shell 119, to a cabin pressure control system, or the outflow valve an outflow valve.

The cooled compressed fresh outside air then enters the secondary heat exchanger 130 and is further cooled to nearly ambient temperature. The air exiting the secondary heat exchanger 130 then enters the water extractor 271, where any free moisture is removed, to produce cool medium pressure air. This cool medium pressure air is directed by the valve V2 to the turbine 213. This cool medium pressure air then enters the turbine 213 through a nozzle. The cool medium pressure air is expanded across the turbine 213 and work extracted from the cool high pressure air.

The two air flows (e.g., the fresh outside air sourcing from 201 and the bleed air sourcing from inlet 101) are mixed downstream of the turbine 213 to produce mixed air. This downstream location can be considered a first mixing point of the environmental control system 200. The mixed air leaves then enters the condenser 160 to cool the bleed air leaving the primary heat exchanger 120. The mixed air is then sent to condition the chamber 102.

This low altitude operation can be consider a low altitude mode. The low altitude mode can be used for ground and low altitude flight conditions, such as ground idle, taxi, take-off, and hold conditions.

In high altitude operation of the environmental control system 200, the fresh outside air can be mixed downstream of the condenser 160 (rather than downstream of the turbine 113 or at the first mixing point). In this situation, the air exiting the water extractor 271 is the cool medium pressure air. This cool medium pressure air is directed by the valve V2 to downstream of the condenser 160. The location at which this cool medium pressure air mixes with the bleed air, which is sourced from the inlet 101 and exiting the condenser 160, can be considered a second mixing point of the environmental control system 200.

This high altitude operation can be considered a high altitude mode. The high altitude mode can be used at high altitude cruise, climb, and descent flight conditions. In the high altitude mode, fresh air aviation requirements for passengers are met by mixing the two air flows (e.g., the fresh outside air sourcing from 201 and the bleed air sourcing from inlet 101). Further, depending on an altitude of the aircraft, an amount of bleed air needed can be reduced. In this way, the environmental control system 200 provides bleed air reduction ranging from 40% to 75% to provide higher efficiencies with respect to engine fuel burn than contemporary airplane air systems.

Figure 3:
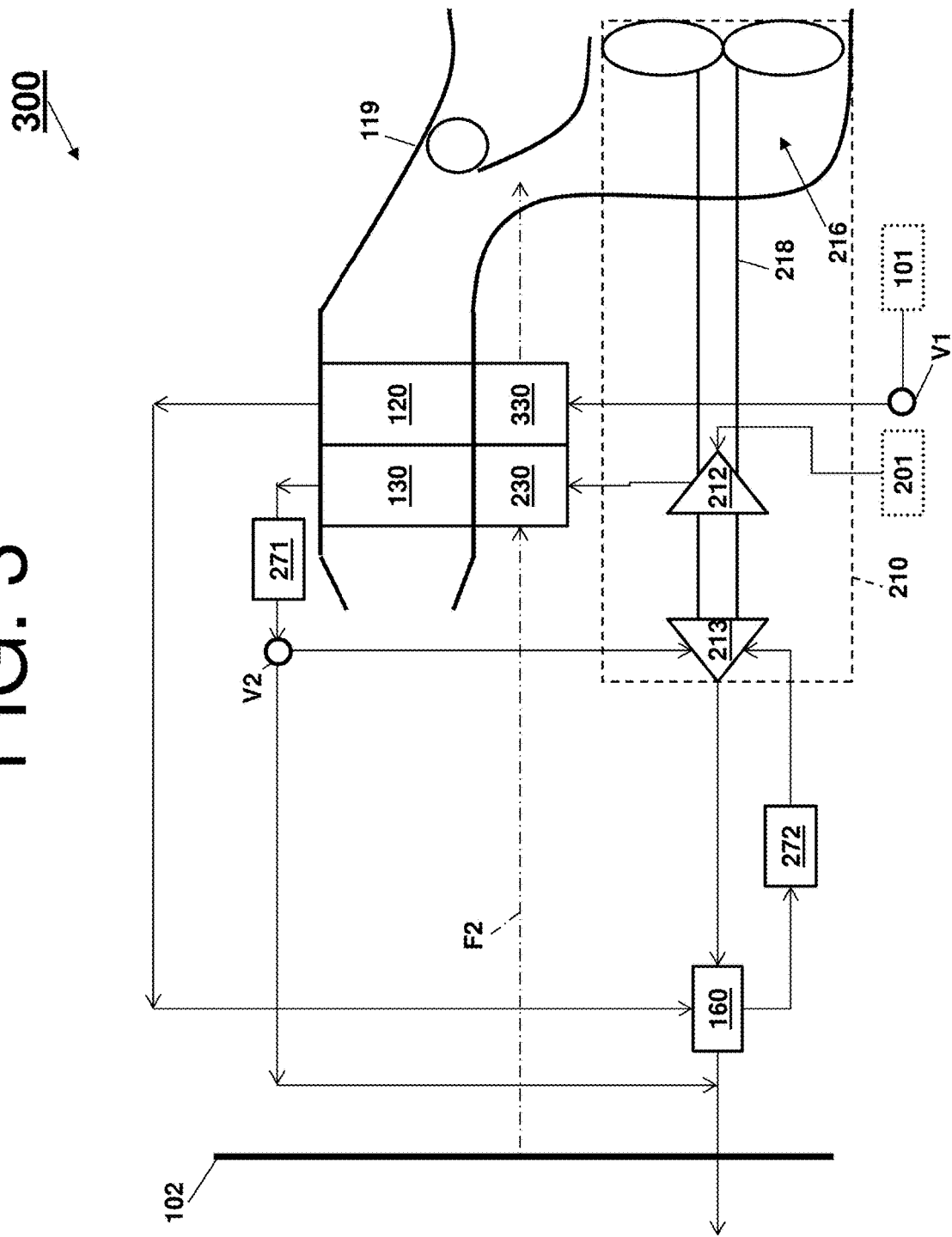
FIG. 3 is a diagram of a schematic of an environmental control system that includes a plurality of outflow heat exchangers according to an embodiment.

FIG. 3 illustrates a variation of the environmental control system 200. In general. Turning now to FIG. 3, a schematic of an environmental control system 300 (e.g., an embodiment of the environmental control system 200) is depicted according to an embodiment. Components of the systems 100 and 200 that are similar to the environmental control system 300 have been reused for ease of explanation, by using the same identifiers, and are not re-introduced. Alternative components of the environmental control system 300 include an outflow heat exchanger 330.

The environmental control system 300 operates similarly to the environmental control system 200 in that different mixing points are utilized based on the mode of operation. In addition, the outflow heat exchanger 330 utilizes the cabin discharge air sourcing from chamber 101 to cool the bleed air sourcing from inlet 101. In turn, the environmental control system 300 can significantly reduce the temperature of the bleed air (e.g., by as much as 100° F.) entering the primary heat exchanger, thereby enabling a reduction in size of the primary heat exchanger 120 and an amount of ram air required by the primary heat exchanger 120.

In addition, an exhaust of the cabin discharge air from the environmental control system 300 can be released through the shell 119, sent to a cabin pressure control system, and the outflow valve an outflow valve. For example, when the cabin discharge air from the outflow heat exchanger 230 and the outflow heat exchanger 330 is coupled to the outflow valve, the outflow heat exchangers 230 and 330 increase the energy in the cabin discharge air, which increases the thrust recovered by the outflow valve, Turning now to FIG. 4, a schematic of an environmental control system 400 (e.g., an embodiment of the environmental control system 200) is depicted according to an embodiment. Components of the systems 100, 200, and 300 that are similar to the environmental control system 400 have been reused for ease of explanation, by using the same identifiers, and are not re-introduced. Alternative components of the environmental control system 400 include a compressing device 410 (that comprises a compressor 412, a turbine 413, a turbine 414, a fan 416, and a shaft 418) and a vale V4, along with a path for a medium denoted by dot-dashed lines F4.1 and F4.2.

In low altitude operation of the environmental control system 400, high-pressure high-temperature air from either the turbine engine or the auxiliary power unit via inlet 101 through the valve V1 enters the primary heat exchanger 120. The primary heat exchanger 120 cools the pressure high-temperature air to nearly ambient temperature to produce cool high pressure air. This cool high pressure air enters the condenser 160, where it is further cooled by air from the turbine 413 of the compressing device 410. Upon exiting the condenser 160, the cool high pressure air enters the water extractor 272 so that moisture in the air is removed.

The cool high pressure air enters the turbine 413 through a nozzle. The cool high pressure air is expanded across the turbine 413 and work extracted from the cool high pressure air. This extracted work drives the compressor 412 used to compress fresh outside air. This extracted work also drives the fan 416, which is used to move air (e.g., ram air) through the primary heat exchanger 120 and the secondary heat exchanger 130 (also known as ram air heat exchangers).

The act of compressing the fresh outside air, heats the fresh outside air. The compressed fresh outside air enters the outflow heat exchanger 230 and is cooled by the cabin discharge air (see the dot-dashed line F2) to produce cooled compressed fresh outside air. The outflow heat exchanger 230, as directed via the valve V4, exhausts the cabin discharge through the shell 119.

The cooled compressed fresh outside air then enters the secondary heat exchanger 130 and is further cooled to nearly ambient temperature. The air exiting the secondary heat exchanger 130 then enters the water extractor 271, where any free moisture is removed, to produce cool medium pressure air. This cool medium pressure air is directed by the valve V2 to the turbine 413. This cool medium pressure air then enters the turbine 413 through a nozzle. The cool medium pressure air is expanded across the turbine 413 and work extracted from the cool high pressure air.

The two air flows (e.g., the fresh outside air sourcing from 201 and the bleed air sourcing from inlet 101) are mixed downstream of the turbine 413 to produce mixed air. This downstream location can be considered a first mixing point of the environmental control system 200. The mixed air leaves then enters the condenser 160 to cool the bleed air leaving the primary heat exchanger 120. The mixed air is then sent to condition the chamber 102.

This low altitude operation can be consider a low altitude mode. The low altitude mode can be used for ground and low altitude flight conditions, such as ground idle, taxi, take-off, and hold conditions.

In high altitude operation of the environmental control system 200, the fresh outside air can be mixed downstream of the condenser 160 (rather than downstream of the turbine 413 or at the first mixing point). In this situation, the air exiting the water extractor 271 is the cool medium pressure air. This cool medium pressure air is directed by the valve V2 to downstream of the condenser 160. The location at which this cool medium pressure air mixes with the bleed air, which is sourced from the inlet 101 and exiting the condenser 160, can be considered a second mixing point of the environmental control system 200.

In addition, the outflow heat exchanger 230, as directed via the valve V4, exhausts the cabin discharge air to the turbine 414 to utilize energy of the cabin discharge air to power the compressor 412. Thus, the turbine 414 can then feed hot air from the outflow valve and the compressor 412 receives power from both the bleed air and the cabin discharge air.

This high altitude operation can be considered a high altitude mode. The high altitude mode can be used at high altitude cruise, climb, and descent flight conditions. In the high altitude mode, fresh air aviation requirements for passengers are met by mixing the two air flows (e.g., the fresh outside air sourcing from 201 and the bleed air sourcing from inlet 101). Further, depending on an altitude of the aircraft, an amount of bleed air needed can be reduced. In this way, the environmental control system 200 provides bleed air reduction ranging from 40% to 60% to provide higher efficiencies with respect to engine fuel burn than contemporary airplane air systems.

Figure 5:
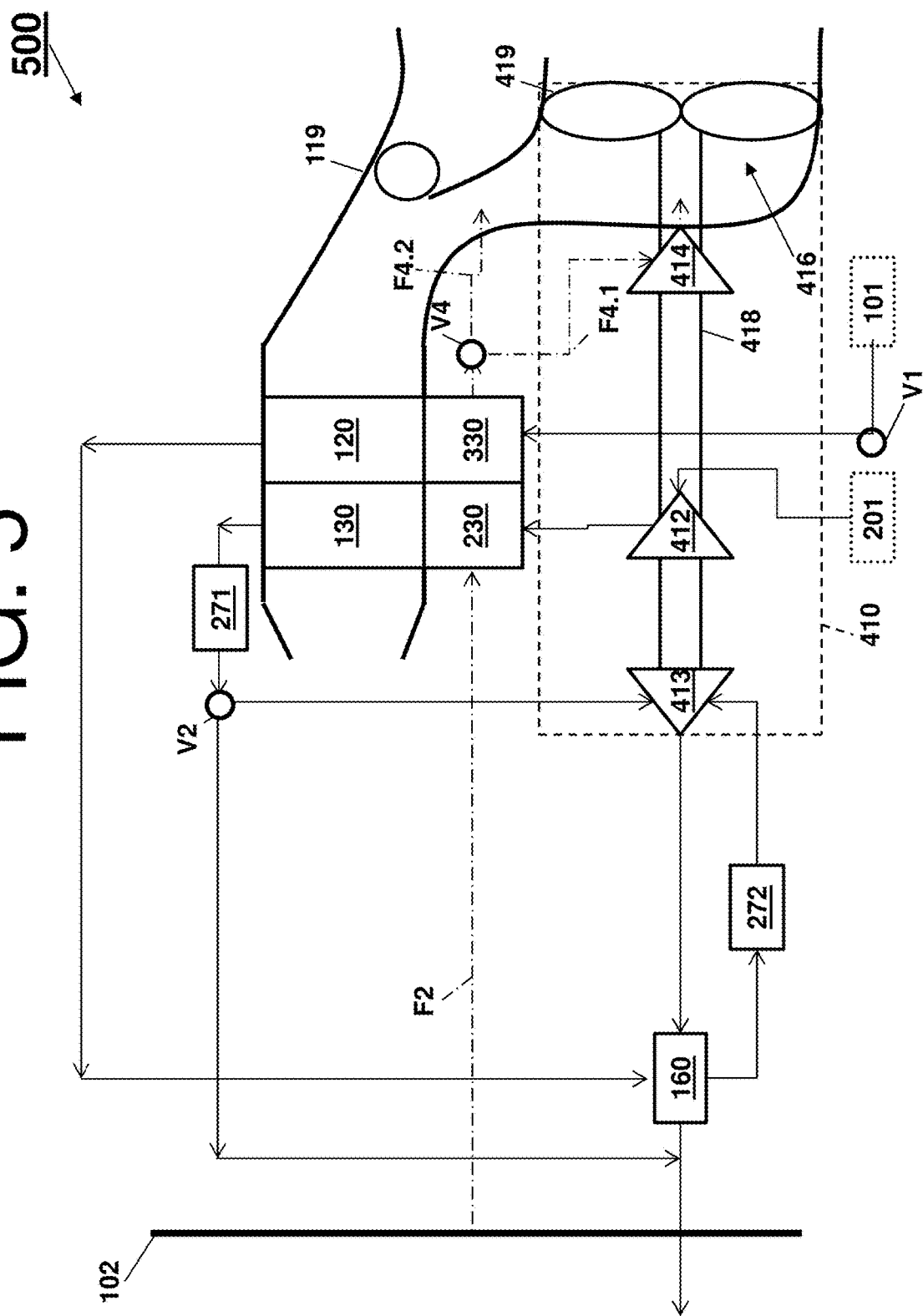
FIG. 5 is a diagram of a schematic of an environmental control system that includes a plurality of outflow heat exchangers according to another embodiment.

FIG. 5 illustrates a variation of the environmental control system 400. In general. Turning now to FIG. 5, a schematic of an environmental control system 500 (e.g., an embodiment of the environmental control system 400) is depicted according to an embodiment. Components of the systems 100, 200, 300, and 400 that are similar to the environmental control system 500 have been reused for ease of explanation, by using the same identifiers, and are not re-introduced.

The environmental control system 500 operates similarly to the environmental control systems 200 and 400 in that different mixing points are utilized based on the mode of operation. In addition, the outflow heat exchanger 330 utilizes the cabin discharge air sourcing from chamber 101 to cool the bleed air sourcing from inlet 101. In turn, the environmental control system 300 can significantly reduce the temperature of the bleed air (e.g., by as much as 100° F.) entering the primary heat exchanger, thereby enabling a reduction in size of the primary heat exchanger 120 and an amount of ram air required by the primary heat exchanger 120.

Figure 6:
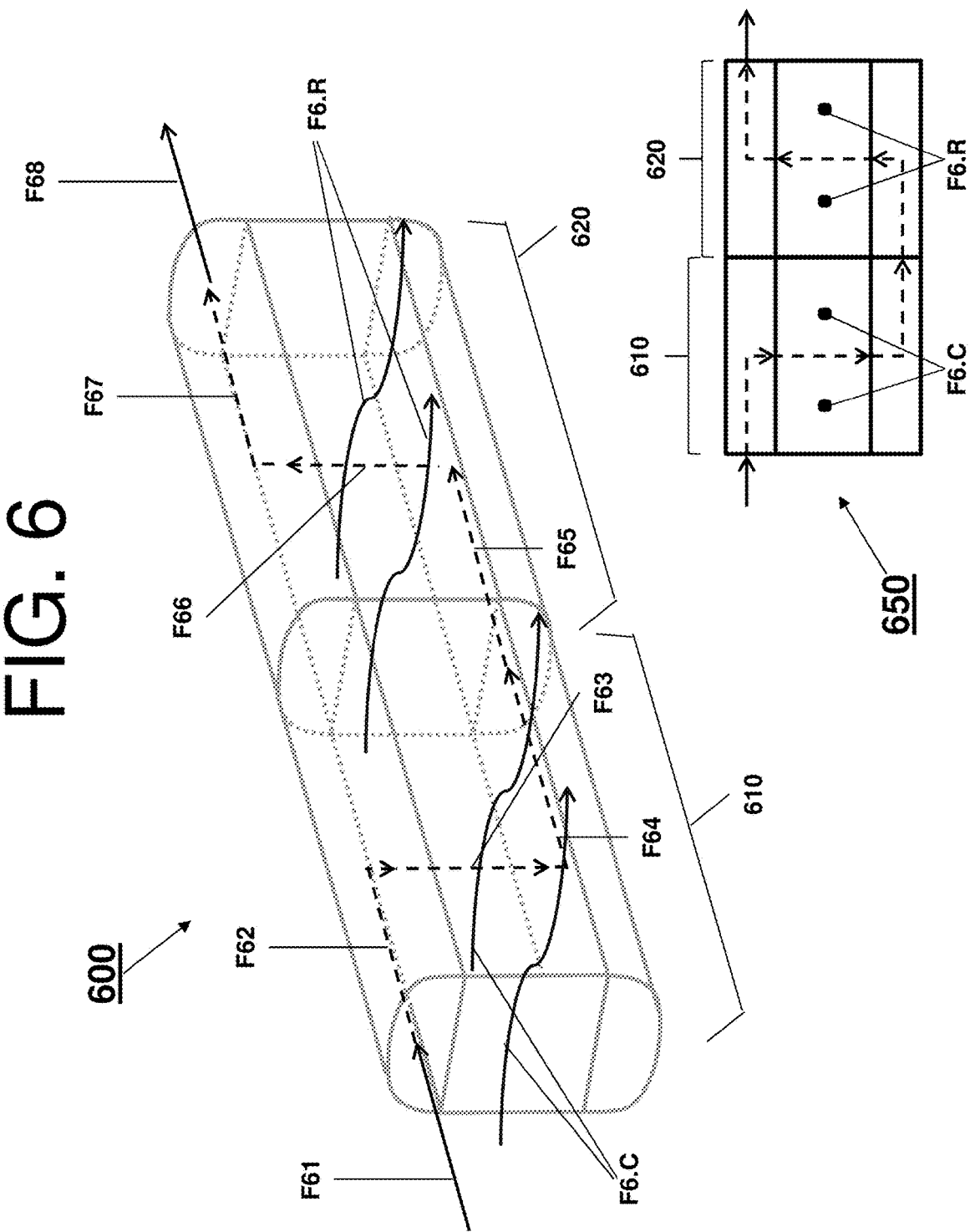
FIG. 6 is a diagram of a schematic of an exchanger configuration according to an embodiment.

Turning now to FIGS. 6 and 7, embodiments of a heat exchanger configuration are shown. In general, the above systems 100, 200, 300, 400, and 500 can comprise one or more heat exchanger configurations, each of which can be configured as two, three, or four medium exchangers. Further, the alignment of the heat exchanger configurations can vary.

FIG. 6 illustrates a heat exchanger configuration 600 with a non-linear alignment. The heat exchanger configuration 600 includes a first exchanger section 610 and a second heat exchanger section 620. The heat exchanger sections 610 and 620 can align with the systems 200, 300, 400, and 500.

Figure 4:
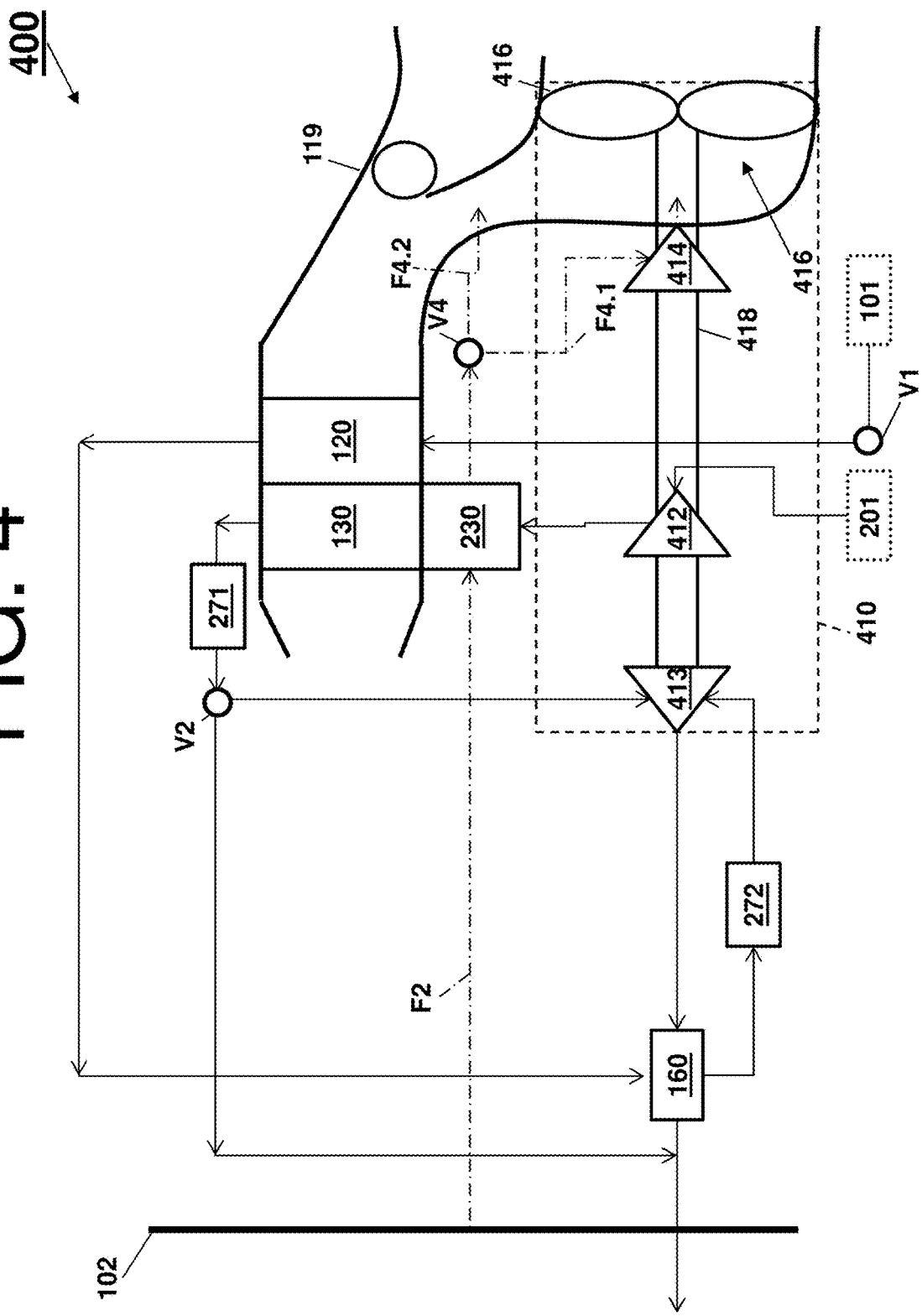
FIG. 4 is a diagram of a schematic of an environmental control system that includes an outflow heat exchanger according to another embodiment.

In an embodiment of the heat exchanger configuration 600 with reference to FIGS. 2 and 4, the first exchanger section 610 can correspond to the outflow heat exchanger 230 and the second heat exchanger section 620 can correspond to the secondary heat exchanger 130. For example, the secondary heat exchanger 130 can be a dual heat exchanger that comprises the outflow heat exchanger 230 and the secondary heat exchanger 130.

In operation, a flow of fresh air can follow the path outlined by lines F61-F68, such that an external flow (line F61) enters a first header of the first exchanger section 610 and is directed towards (line F62) the outflow heat exchanger 230. The flow of the fresh air crosses (line F63) the outflow heat exchanger 230 and enters a second header of the first exchanger section 610. The flow of the fresh air proceeds through second header of the first exchanger section 610 (line F64) and enters a first header of the second exchanger section 620, where it is directed towards (line F65) the secondary heat exchanger 130. The flow of the fresh air crosses (line F66) the secondary heat exchanger 130 and enters a second header of the second exchanger section 620. The flow of the fresh air is directed by the second header of the second exchanger section 620 (line F67) to exit the heat exchanger configuration 600 (line F68).

In addition, the outflow heat exchanger 230 receives a flow of cabin discharge air (lines F6.C) and the secondary heat exchanger 130 receives a flow of ram air (lines F6.R). The flows of the cabin discharge air (F6.C) and the ram air (F6.R) are represented as flowing in a first direction with respect to the fresh air according to an embodiment. According to other embodiments, the flows of the cabin discharge air (F6.C) and the ram air (F6.R) can be in a direction opposite to the first direction. According to other embodiments, the flows of the cabin discharge air (F6.C) and the ram air (F6.R) can be in different directions.

A profile view 650 further illustrates the non-linear flow of the fresh air. Note that, in this profile view 650, the flows of the cabin discharge air (F6.C) and the ram air (F6.R) are perpendicular to plane of the non-linear flow of the fresh air.

The above embodiment of the heat exchanger configuration 600 can be combined in a single unit with the primary heat exchanger 120, where the single unit can be referred to as a four medium heat exchanger or a triple heat exchanger.

In another embodiment of the heat exchanger configuration 600 with reference to FIGS. 3 and 5, the first exchanger section 610 can represent the outflow heat exchanger 230 and the second heat exchanger section 620 can represent the outflow heat exchanger 330. For example, the heat exchanger configuration 600 with reference to FIGS. 3 and 5 can be a dual heat exchanger that comprises the outflow heat exchanger 230 and the outflow heat exchanger 330.

In operation, a flow of cabin discharge air can follow the path outlined by lines F61-F68, such that an external flow (line F61) enters a first header of the first exchanger section 610 and is directed towards (line F62) the outflow heat exchanger 230. The flow of the cabin discharge air crosses (line F63) the outflow heat exchanger 230 and enters a second header of the first exchanger section 610. The flow of fresh air proceeds through second header of the first exchanger section 610 (line F64) and enters a first header of the second exchanger section 620, where it is directed towards (line F65) the outflow heat exchanger 330. The flow of the cabin discharge air crosses (line F66) the outflow heat exchanger 330 and enters a second header of the second exchanger section 620. The flow of the cabin discharge air is directed by the second header of the second exchanger section 620 (line F67) to exit the heat exchanger configuration 600 (line F68).

In addition, the outflow heat exchanger 230 receives a flow of fresh air (lines F6.C) and the secondary heat exchanger 130 receives a flow of bleed air (lines F6.R). The flows of the fresh air (F6.C) and the ram air (F6.R) are represented as flowing in a first direction with respect to the cabin discharge air according to an embodiment. According to other embodiments, the flows of the fresh air (F6.C) and the ram air (F6.R) can be in a direction opposite to the first direction. According to other embodiments, the flows of the fresh air (F6.C) and the ram air (F6.R) can be in different directions.

Note that the heat exchanger configuration 600 can be utilized so that that the sections 610 and 620 can correspond to one or more of the heat exchangers 120, 130, 230, and 330 of FIG. 3 or 5.

FIG. 7 illustrates a heat exchanger configuration 700 with a linear alignment. The heat exchanger configuration 700 includes a first exchanger section 710 and a second heat exchanger section 720. The heat exchanger sections 710 and 720 can align with the systems 200, 300, 400, and 500.

In an embodiment of the heat exchanger configuration 700 with reference to FIGS. 2 and 4, the first exchanger section 710 can correspond to the outflow heat exchanger 230 and the second heat exchanger section 720 can correspond to the secondary heat exchanger 130 (alternatively, the first exchanger section 710 can correspond to the secondary heat exchanger 130 and the second heat exchanger section 720 can correspond to the primary heat exchanger 120). For example, the secondary heat exchanger 130 can be a dual heat exchanger that comprises the outflow heat exchanger 230 and the secondary heat exchanger 130. In a linear configuration of the dual heat exchanger, the first exchanger section 710 and the second exchanger section 720 can comprise a continuous second medium surface and/or one or more continuous second medium fins.

In operation, a flow of fresh air can follow the path outlined by lines F71-F74, such that an external flow (line F71) enters the first exchanger section 710 and flows linearly through (line F72) the first exchanger section 710. The flow of the fresh air then enters the second exchanger section 720 and flows linearly through (line F73) the second exchanger section 720. The flow of the fresh air then exits the heat exchanger configuration 700 (line F74).

In addition, the first exchanger section 710 receives a flow of cabin discharge air (lines F7.C) and the second exchanger section 720 receives a flow of ram air (lines F7.R). The flows of the cabin discharge air (F7.C) and the ram air (F7.R) are represented as flowing in a first direction with respect to the fresh air according to an embodiment. According to other embodiments, the flows of the cabin discharge air (F7.C) and the ram air (F7.R) can be in a direction opposite to the first direction. According to other embodiments, the flows of the cabin discharge air (F7.C) and the ram air (F7.R) can be in different directions.

A profile view 750 further illustrates the linear flow of the fresh air. Note that, in this profile view 750, the flows of the cabin discharge air (F7.C) and the ram air (F7.R) are perpendicular to plane of the non-linear flow of the fresh air.

The above embodiment of the heat exchanger configuration 700 can be combined in a single unit with the primary heat exchanger 120, where the single unit can be referred to as a four medium heat exchanger or a triple heat exchanger.

In another embodiment of the heat exchanger configuration 700 with reference to FIGS. 3 and 5, the first exchanger section 710 can represent the outflow heat exchanger 230 and the second heat exchanger section 720 can represent the outflow heat exchanger 330. For example, the heat exchanger configuration 700 with reference to FIGS. 3 and 5 can be a dual heat exchanger that comprises the outflow heat exchanger 230 and the outflow heat exchanger 330.

In operation, a flow of cabin discharge air can follow the path outlined by lines F71-F74, such that an external flow (line F71) enters the first exchanger section 710 and flows linearly through (line F72) the first exchanger section 710. The flow of the cabin discharge air then enters the second exchanger section 720 and flows linearly through (line F73) the second exchanger section 720. The flow of the cabin discharge air then exits the heat exchanger configuration 700 (line F74).

In addition, the first exchanger section 710 receives a flow of fresh air (lines F7.C) and the second exchanger section 720 receives a flow of bleed air (lines F7.R). The flows of the fresh air (F7.C) and the bleed air (F7.R) are represented as flowing in a first direction with respect to the cabin discharge air according to an embodiment. According to other embodiments, the flows of the fresh air (F7.C) and the bleed air (F7.R) can be in a direction opposite to the first direction. According to other embodiments, the flows of the fresh air (F7.C) and the bleed air (F7.R) can be in different directions.

Note that the heat exchanger configuration 700 can be utilized so that that the sections 710 and 720 can correspond to one or more of the heat exchangers 120, 130, 230, and 330 of FIG. 3 or 5.

In view of the above, the technical effects and benefits of the outflow heat exchanger 230 and/or the outflow heat exchanger 330 (either of which can also referred to as a cabin outflow heat exchanger and/or outflow valve heat exchanger) include significantly lowering a temperature of the fresh air leaving the compressor 212 and entering the secondary heat exchanger 130, which aids in a removal of moisture on the ground and a ram air flow reduction at cruise.

The technical effects and benefits of the outflow heat exchanger 230 and/or the outflow heat exchanger 330 include significantly raising the temperature of the cabin discharge air, and thereby raising its energy level of the cabin discharge air.

In an embodiment, if the outflow valve heat exchanger is tied to a thrust recovery outflow valve, the airplane can receive more thrust from the thrust recovery outflow valve.

In another embodiment, if the cabin outflow heat exchanger is tied to a turbine on a compressing device (as shown in FIGS. 4 and 5 with respect to turbine 414 and compressing device 410), an increased turbine inlet temperature provides a further reduction in a use of bleed air, thereby reducing fuel burn by the airplane. Further, if the dual heat exchanger embodiment is utilized, the cabin discharge air can also reduce a temperature of the bleed air and further increase an outflow air temperature and energy (increased temperature increases the above noted benefits).

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of embodiments herein. For instance, the steps may be performed in a differing order or steps may be added, deleted or modified. All of these variations are considered a part of the claims.

While the preferred embodiment has been described, it will be understood that those skilled in the art, both now and in the future, may make various improvements and enhancements which fall within the scope of the claims which follow. These claims should be construed to maintain the proper protection.

What is claimed is:

1. An airplane comprising:
a pressurized volume configured to provide a first medium;
an air conditioning system comprising:
a heat exchanger configured to transfer heat from a second medium to the first medium, and
a compressor configured to receive the second medium, wherein the compressor is upstream of the heat exchanger in a flow path of the second medium;
a flow of a third medium; and
an additional heat exchanger configured to transfer heat from the third medium to the first medium.

2. The airplane of claim 1, wherein the first medium is cabin discharge air, and
wherein the second medium is fresh air.

3. The airplane of claim 1, comprising:
an outflow valve downstream of the heat exchanger in a flow path of the first medium.

4. The airplane of claim 1, comprising:
a turbine downstream of the heat exchanger in a flow path of the first medium.

5. The airplane of claim 1, wherein the heat exchanger and the additional heat exchanger comprise a continuous second medium surface.

6. The airplane of claim 1, wherein the heat exchanger and the additional heat exchanger comprise one or more a continuous second medium fins.

7. The airplane of claim 1, wherein the heat exchanger and the additional heat exchanger are included in a dual heat exchanger.

8. The airplane of claim 1, wherein the third medium is pressurized air.

9. The airplane of claim 1, wherein the additional heat exchanger is downstream of the heat exchanger in a flow path of the first medium.

10. The airplane of claim 1, further comprising an outflow valve downstream of the heat exchanger in the flow path of the first medium.

11. The airplane of claim 1, further comprising a turbine downstream of the heat exchanger in the flow path of the first medium.

12. An airplane comprising:
a pressurized volume configured to provide a first medium; and
an air conditioning system comprising:
a three medium heat exchanger; and
a compressor configured to receive a second medium,
wherein the compressor is upstream of the three medium heat exchanger in a flow path of the second medium.

13. The airplane of claim 12, wherein the first medium is cabin discharge air, and
wherein the second medium is fresh air.

14. The airplane of claim 12, wherein the three medium heat exchanger is configured to receive the first medium, the second medium, and a third medium, and
wherein the third medium and the first medium are heat sinks for the second medium.

15. The airplane of claim 14, wherein the third medium is ram air.

16. The airplane of claim 14, wherein the second medium rejects heat to the first medium and then subsequently rejects heat to the third medium.

17. The airplane of claim 14, wherein the second medium rejects heat to the third medium and then subsequently rejects heat to the first medium.

18. The airplane of claim 14, wherein the flow path of the second medium through the three medium heat exchanger is linear.

19. The airplane of claim 14, wherein the flow path of the second medium through the three medium heat exchanger is non-linear.

20. An airplane comprising:
a pressurized volume configured to provide a first medium; and
an air conditioning system comprising:
a four medium heat exchanger; and
a compressor configured to receive a second medium,
wherein the compressor is upstream of the four medium heat exchanger in a flow path of the second medium.

21. The airplane of claim 20, wherein the first medium is cabin discharge air, and
wherein the second medium is fresh air.

22. The airplane of claim 20, wherein the four medium heat exchanger is configured to receive the first medium, the second medium, a third medium, and a fourth medium, and
wherein the third medium and the first medium are heat sinks for the second medium and the fourth medium.

23. The airplane of claim 22, wherein the third medium is ram air, and
wherein the fourth medium is pressurized air.

24. The airplane of claim 22, wherein the second medium rejects heat to the first medium and rejects heat to the third medium, and
wherein the fourth medium rejects heat to the first medium and rejects heat to the third medium.

25. The airplane of claim 22, wherein the first medium receives heat from the second medium and receives heat from the fourth medium.

26. An airplane comprising:
a pressurized volume is configured to provide a first medium; and
an air conditioning system comprising:
a first heat exchanger configured to transfer heat from a second medium to the first medium,
a second heat exchanger configured to transfer heat from the second medium to a third medium,
a third heat exchanger configured to transfer heat from a fourth medium to the first medium, and
a fourth heat exchanger configured to transfer heat from the fourth medium to the third medium.

27. The airplane of claim 26, wherein the first heat exchanger is upstream of the third heat exchanger in a flow path of the first medium.

28. The airplane of claim 26, wherein the first heat exchanger is upstream of the second heat exchanger in a flow path of the second medium.

29. The airplane of claim 26, wherein the third heat exchanger is upstream of the forth heat exchanger in a flow path of the fourth medium.

* * * * *